J. A. BATSON.
PLOW ATTACHMENT.
APPLICATION FILED JUNE 19, 1907.

927,479.

Patented July 13, 1909.
3 SHEETS—SHEET 1.

Inventor
Joseph A. Batson.

Witnesses

By

Attorneys

J. A. BATSON.
PLOW ATTACHMENT.
APPLICATION FILED JUNE 19, 1907.
927,479.
Patented July 13, 1909.
3 SHEETS—SHEET 2.
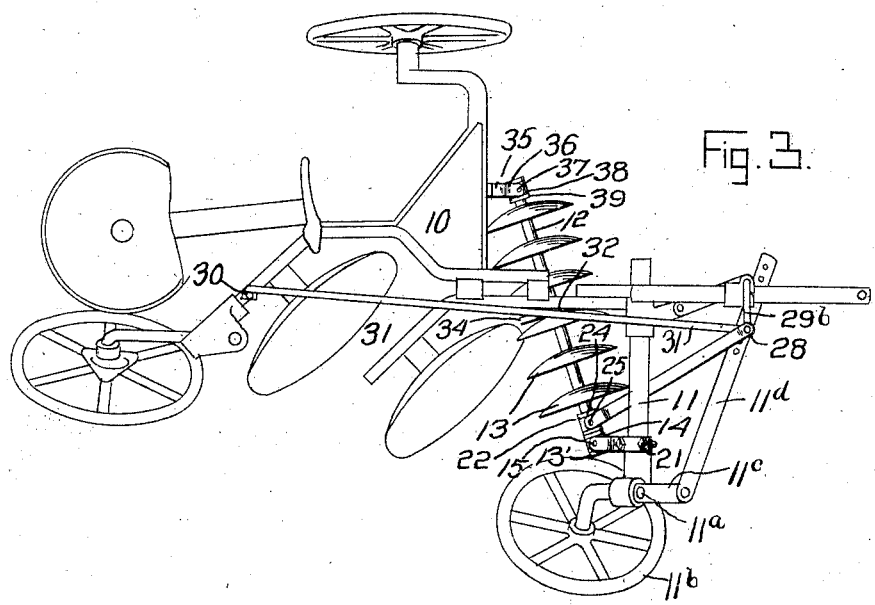
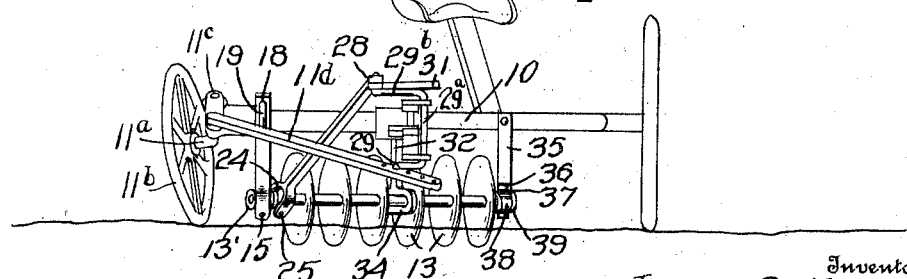
Witnesses
C. K. Reichenbach
F. G. Smith
Inventor
Joseph. A. Batson.
By Chandlee Chandlee
Attorneys J. A. BATSON.
PLOW ATTACHMENT.
APPLICATION FILED JUNE 19, 1907.
927,479.
Patented July 13, 1909.
3 SHEETS—SHEET 3.
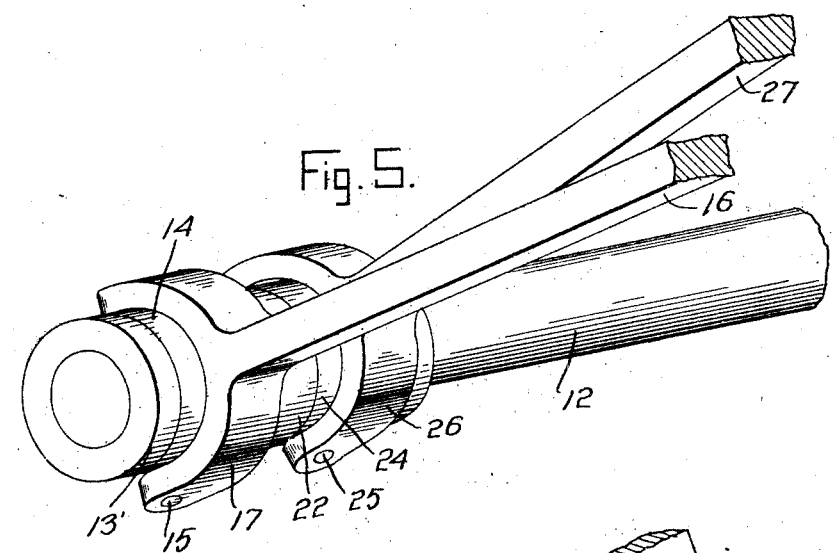
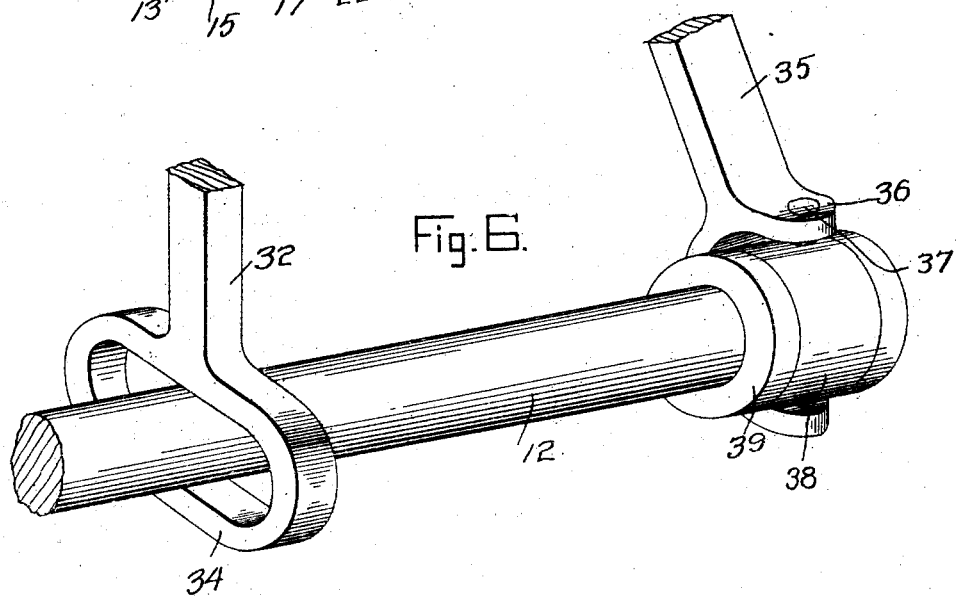
Witnesses
C. R. Reichenbach
F. G. Smith.
Inventor
Joseph. A. Batson.
By Chandlee & Chandlee
Attorneys

UNITED STATES PATENT OFFICE.

JOSEPH A. BATSON, OF LAKEVIEW, TEXAS.

PLOW ATTACHMENT.

No. 927,479.     Specification of Letters Patent.     Patented July 13, 1909.

Application filed June 19, 1907. Serial No. 379,767.

*To all whom it may concern:*

Be it known that I, JOSEPH A. BATSON, a citizen of the United States, residing at Lakeview, in the county of Hall, State of Texas, have invented certain new and useful Improvements in Plow Attachments; and I do hereby declare the following to be a full, clear, and exact description of the invention, such as will enable others skilled in the art to which it appertains to make and use the same.

This invention relates to plow attachments and more particularly to an attachment for the purpose of cutting the stalks in a field being plowed by the plow and for breaking up the larger clods of soil.

The primary object of the invention is to provide an attachment of this class which may be readily applied to and removed from any of the ordinary disk plows now in use and which will treat the soil as stated before the disks of the plow act thereon. In other words, the invention is designed when used in connection with a disk plow, to cut any stalks that may be in the field, break clods of soil and practically harrow the ground so that when the furrows are made by the plow disks, the soil will be ready for planting.

One of the novel features of the attachment resides in the fact that the means for connecting it with the plow is so arranged that when the front furrow wheel is turned, the attachment will also be turned so as not to exert a side pull.

Figure 1:
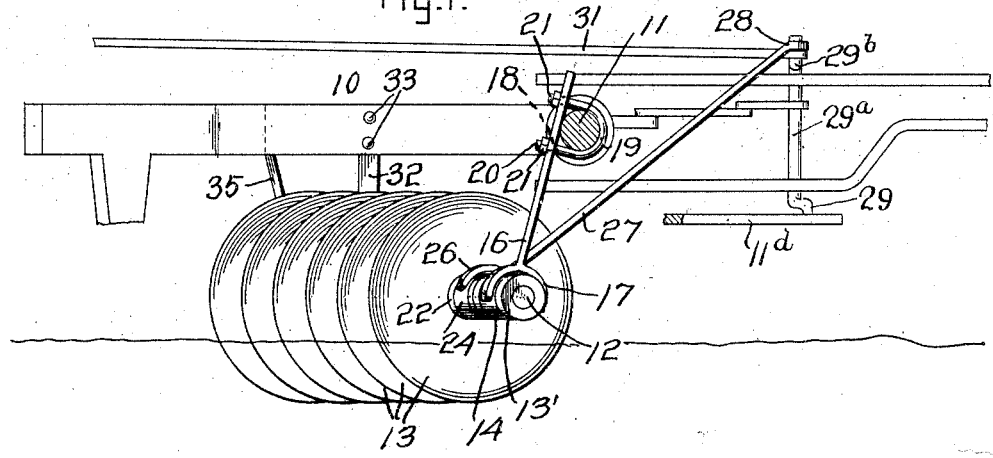
Figure 2:
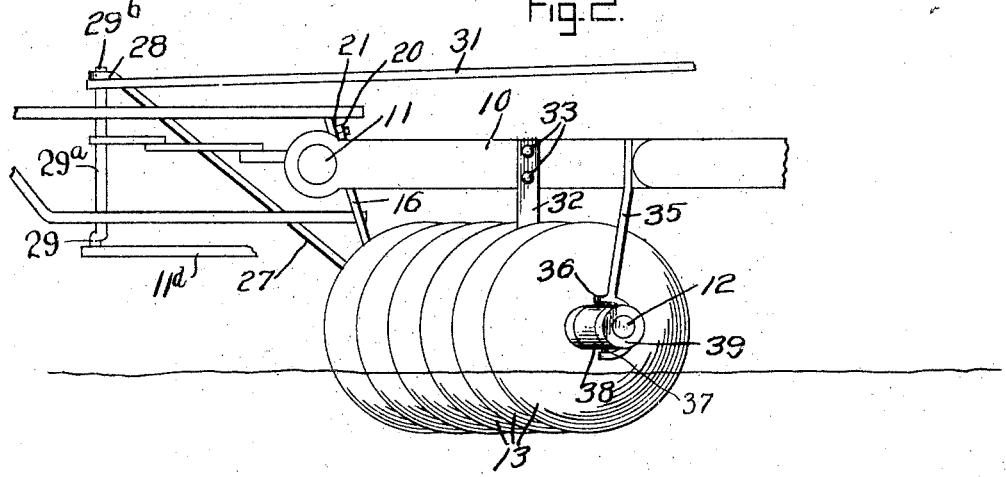

In the accompanying drawings, Figure 1 is a side elevation of a disk plow showing the application of the invention thereto, the plow being shown in light lines, Fig. 2 is a similar view of the opposite side of the plow and attachment, Fig. 3 is a top plan view thereof, Fig. 4 is a front elevation, Fig. 5 is a detail view partly in section of the attachment showing the manner of supporting one end of the shaft for the same, and, Fig. 6 is a similar view showing the manner of supporting the opposite end of the shaft.

In the drawings there is illustrated a disk plow which may be of any desired construction, and includes a frame having at its front end a laterally projecting bracket 11, in the end of which is swiveled a vertical shaft 11$^a$ carrying a staggered furrow-wheel 11$^b$, and having a crank 11$^c$ linked by a bar 11$^d$ to the cranked lower end 29 of a vertical shaft 29$^a$ mounted on the plow frame. The upper end of the shaft 29$^a$ has a crank arm 29$^b$ which is connected by a link 31 to a hand lever 30 mounted on the plow frame. When this lever is rocked, the furrow-wheel 11$^b$ will be swung around to enable the plow to make a turn.

The attachment embodying my invention comprises a shaft 12 upon which are mounted disks 13 of the usual construction. Fixed upon the shaft in any suitable manner and adjacent one of its ends is a peripherally grooved sleeve 13' embracing which is a collar 14, the said collar being seated in the groove and being provided with studs 15 which project therefrom at diametrically opposite points. An arm 16 is provided at its lower end with a yoke portion 17 the ends of the arms of which are apertured for the passage of the studs upon the collar. The arm 16 is provided with openings 18 and a clip 19 is engaged loosely around the bracket 11 and is free to slide back and forth thereon, and has its threaded ends 20 engaged through the openings in the arm, there being nuts 21 engaged upon the said bracket.

I have as heretofore stated provided means whereby the attachment will be turned with the furrow-wheel 11$^a$ and this means will now be described. A sleeve 22, which is grooved in the same manner as the sleeve 13' is fixed upon the shaft 12 inwardly of the sleeve 13' and embracing this sleeve 22 is a collar 24 provided with studs 25 which project through openings in the ends of a yoke 26 formed at one end of an arm 27. The other end of this arm is bent as at 28 so as to permit of its being attached to the crank arm 29$^b$. It will thus be seen that when the lever 30 is rocked to turn the furrow-wheel 11$^b$ as hereinbefore described, the shaft 12 will be correspondingly swung.

In order to support the opposite end of the shaft 12 I have provided a bracket which comprises an attaching portion 32 which is secured by means of bolts 33 to the frame of the plow and which has an elongated open body portion 34 through which the shaft 12 passes and is guided, the said portion of the bracket being located between a pair of the disks 13. It will be understood of course that the shaft has a loose movement in the elongated open portion of the bracket as it is swung in the manner heretofore stated. A bracket arm 35 also aids in supporting the shaft 12 at the end thereof opposite to the end to which the arm 16 is connected. This arm is secured at its upper end to the frame of the plow and is provided at its forward or lower end with a yoke portion 36 through the ends of which are engaged studs 37 formed upon a collar 38 which collar encircles a grooved sleeve 39 upon the said end of the shaft 12. This arm 36 is rigid and it will be understood that it forms an axis for the turning movement of the shaft 12 when the furrow-wheel 11^b is turned.

What is claimed is:

1. The combination with the frame of a plow, the front bracket thereof carrying a furrow-wheel, and means for turning the furrow-wheel, of a disk shaft swiveled at one end on the plow frame, and slidably supported at the other end on the bracket, and a connection between the furrow-wheel turning means and the disk shaft, for swinging said shaft simultaneously with the furrow-wheel.

2. The combination with the frame of a plow, of a front bracket, a furrow wheel supported thereon, means for changing the angle of said furrow wheel with reference to the frame of the plow, a disk shaft swiveled at one end to the plow frame and slidably supported at the other end on the bracket, an intermediate support for said disk shaft comprising a bracket having an elongated open body portion through which the shaft passes, and a swivel connection between the furrow wheel turning means and the end of the disk shaft which is supported on the bracket for simultaneously swinging said shaft and furrow-wheel.

In testimony whereof, I affix my signature, in presence of two witnesses.

JOSEPH A. BATSON.

Witnesses:
H. E. DRAVER,
W. F. CUNNINGHAM.